United States Patent
Eriksson et al.

(10) Patent No.: US 8,588,051 B2
(45) Date of Patent: Nov. 19, 2013

(54) CROSSTALK LIMITATION BETWEEN MODEMS

(75) Inventors: Per-Erik Eriksson, Stockholm (SE); Chenguang Lu, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 363 days.

(21) Appl. No.: 13/021,734

(22) Filed: Feb. 5, 2011

(65) Prior Publication Data

US 2012/0183026 A1 Jul. 19, 2012

Related U.S. Application Data

(63) Continuation of application No. PCT/SE2011/050039, filed on Jan. 14, 2011.

(51) Int. Cl.
*H04B 1/38* (2006.01)
*H04J 3/10* (2006.01)

(52) U.S. Cl.
USPC .......................................... 370/201; 375/222

(58) Field of Classification Search
USPC ................... 370/201; 375/219, 222
See application file for complete search history.

(56) References Cited

U.S. PATENT DOCUMENTS

| 7,801,017 | B2 * | 9/2010 | Nuzman ....................... 370/201 |
| 8,306,097 | B2 * | 11/2012 | De Lind Van Wijngaarden et al. ............................. 375/222 |
| 8,369,391 | B2 * | 2/2013 | Engstrom et al. ............. 375/222 |
| 2009/0175156 | A1 * | 7/2009 | Xu ................................ 370/201 |
| 2010/0046355 | A1 | 2/2010 | Nuzman |
| 2010/0232486 | A1 * | 9/2010 | Starr et al. .................... 375/222 |
| 2011/0007788 | A1 * | 1/2011 | Cendrillon et al. ........... 375/222 |
| 2011/0080938 | A1 * | 4/2011 | Fisher et al. .................. 375/222 |
| 2011/0096870 | A1 * | 4/2011 | Schenk et al. ................ 375/296 |
| 2012/0020418 | A1 * | 1/2012 | Sands et al. ................... 375/259 |

FOREIGN PATENT DOCUMENTS

EP 2136477 A1 12/2009

OTHER PUBLICATIONS

ITU-T Standard G993.2, Series G: Transmission Systems and Media,Digital Systems and Networks Digital sections and digital line system—Access networks; Very high speed digital subscriber line transceivers 2 (VDSL2); Amendment 6: New Annex L and revision of channel initialization policy, Nov. 2010.
ITU-T Standard G993.5, Series G: Transmission Systems and Media,Digital Systems and Networks Digital sections and digital line system—Access networks; Self-FEXT cancellation (vectoring) for use with VDSL2 transceivers, Apr. 2010.
Sweden Patent Office, Int'l Search Report in PCT/SE2011/050039, Sep. 29, 2011.
Sweden Patent Office, Written Opinion in PCT/SE2011/050039, Sep. 29, 2011.

* cited by examiner

*Primary Examiner* — Chi Pham
*Assistant Examiner* — Robert Lopata
(74) *Attorney, Agent, or Firm* — Potomac Patent Group PLLC

(57) ABSTRACT

A device for providing access to a data communication network for modems is connected to the modems via a set of communication lines. The modems include a first group supporting vectoring and a second group not supporting vectoring. The device investigates the expected value of an element in a synchronization interval to be received by a modem in the second group, investigates the value of an element of at least one data sequence assigned to the communication line of this modem, compares the values, selects the element of the investigated data sequence for transmission if the element value corresponds to the expected value and transmits the selected element and corresponding elements of a number of pilot sequences assigned to the first group of modems via the set of communication lines.

29 Claims, 6 Drawing Sheets

//  CROSSTALK LIMITATION BETWEEN MODEMS

TECHNICAL FIELD

The invention relates to reducing crosstalk between modems connected to a set of communication lines. More particularly, the invention relates to a method and a computer program product for limiting crosstalk between modems connected to a set of communication lines as well as to a device for providing access to a data communication network.

BACKGROUND

Modems like Digital Subscriber Line (DSL) modems are normally connected to a device for providing access to a data communication network. Such a device is typically a Digital Subscriber Line Access Multiplexer (DSLAM) and the communication network may be the Internet. One particular type of standard that may be of interest is Very-high-speed Digital Subscriber Line 2 (VDSL2).

When being connected in this way the modems are connected to the device via separate communication lines, typically conductor pairs made of copper. These lines are furthermore often bundled together as a set of connection lines that is provided in a common cable leading to the device. This means that the communication lines are often placed very close to each other. There is in this regard a problem in that a communication line may be subject to crosstalk from one or more neighboring communication lines. This limits the communication capability in that the rate at which data is transmitted is limited.

There has in recent years evolved techniques for reducing the influence of crosstalk, for instance in relation to VDSL2. VDSL2 has been standardized by the Telecommunication Standardization Sector of the International Telecommunications Union (ITU-T) in recommendation G.993.2.

ITU-T has issued a further recommendation G.993.5, specifying vectoring for VDSL2. Vectoring is a technique for Far-end crosstalk (FEXT) cancellation where the transmission and/or reception on communication lines in a cable where VDSL2 is used are jointly processed. In the downstream direction pre-coding is used, which pre-distorts the transmitted signals in such a way so that the crosstalk into other lines is cancelled as the signal propagates along the cable.

In the upstream direction the received signals are post-processed to cancel the FEXT. The VDSL2 FEXT crosstalk is the static noise that most severely limits the performance of VDSL2 systems. The vectoring recommendation provides a way to estimate the FEXT channel in both downstream and upstream and utilize the estimated crosstalk channel to cancel the crosstalk.

This technique provides a significant improvement for DSL modems.

However, as these new types of modems supporting vectoring are being introduced. There still exist older types of modems, often denoted legacy modems, which operate according to previous versions of the VDSL2 standard and do therefore not support vectoring. These older and newer types of modems will most probably have to co-exist for a long period of time.

Furthermore, in order for the vectoring to be able to function properly it is important that the legacy modems either are provided with vectoring support functionality or are provided with functionality that ignores the vectoring so as not to interfere with it.

This is not so simple to do because the modems may be the property of end users, i.e., they may be Customer-premises equipment (CPE). These end users may very well not want any changes to be made to their modems. This means that an update or retrofit of legacy modems may very well not be possible to make.

This thus means that there is a need for a solution to the problem of stopping older types of modems interfering with the vectoring supported by new types of modems.

SUMMARY

The invention is therefore directed towards stopping modems that do not support vectoring from interfering with such vectoring performed in relation to other modems that do support vectoring.

One object of the invention is thus to provide a method for limiting crosstalk between modems connected to a set of communication lines, which stops modems that do not support vectoring from interfering with cross-talk limitation that uses vectoring.

This object is according to a first aspect of the invention achieved through a method for limiting crosstalk between modems connected to a set of communication lines. There is here a first group of modems including at least one modem connected to a first communication line and the modems of the first group support vectoring. There is also a second group of modems including at least one modem connected to a second communication line and the modems of the second group do not support vectoring. The method is performed in a device for providing access to a data communication network and comprises:

investigating the expected value of an element in a synchronisation interval to be received by a modem in the second group via the second communication line in the set of communication lines, investigating the value of an element of at least one data sequence assigned to the second communication line, comparing the two values with each other, selecting the element of the investigated data sequence for transmission if the value of the element corresponds to the expected value, and transmitting the selected element on the second communication line together with corresponding elements of a number of pilot sequences on communication lines leading to the first group of modems.

Another object of the invention is to provide a device for providing access to a data communication network for modems, which device stops modems that do not support vectoring from interfering with cross-talk limitation that uses vectoring.

This object is according to the same aspect achieved by a device for providing access to a data communication network for modems. This device is arranged to be connected to one end of each of a set of communication lines and the modems are connected to opposite ends of the communication lines. There is a first group of modems including at least one modem connected to the device via a first communication line and the modems of the first group support vectoring. There is also a second group of modems including at least one modem connected to the device via a second communication line and the modems of the second group do not support vectoring. The device comprises:

a communication interface, a transmitting unit connected to the communication interface and configured to modulate and transmit data to the modems via the set of communication lines, a receiving unit connected to the communication interface and configured to receive and demodulate data from the modems, and a pilot sequence transmission control unit comprising a first element investigating entity configured to investigate the expected value of an element in a synchronisation interval to be received by a modem in the second group via the second communication line, a second element investigating entity configured to investigate the value of an element of at least one data sequence assigned to the second communication line, a decision entity configured to compare the two values with each other and select the element of the investigated data sequence for transmission if the value of the element corresponds to the expected value, and a pilot sequence transmission control entity configured to provide the selected element of the second communication line together with corresponding elements of a number of pilot sequences assigned to the first group of modems for transmission to the modems via the set of communication lines.

Another object is to provide a computer program product for limiting crosstalk between modems connected to a set of communication lines, which computer program product stops modems that do not support vectoring from interfering with cross-talk limitation that uses vectoring.

This object is according to the same aspect of the invention also achieved through a computer program product for limiting crosstalk between modems connected to a set of communication lines. There is here a first group of modems including at least one modem connected to a device for providing access to a data communication network for modems via a first communication line and the modems of the first group support vectoring. There is also a second group of modems including at least one modem connected to the device via a second communication line and the modems of the second group do not support vectoring. The computer program product comprises computer program code on a data carrier which when run on a processor forming a pilot sequence transmission control unit of the device, causes the pilot sequence transmission control unit to:

investigate the expected value of an element in a synchronisation interval to be received by a modem in the second group via the second communication line, investigate the value of an element of at least one data sequence assigned to the second communication line, compare the two values with each other, select the element of the investigated data sequence for transmission if the value of the element corresponds to the expected value, and provide the selected element of the second communication line together with corresponding elements of a number of pilot sequences assigned to the first group of modems for transmission to the modems via the set of communication lines.

The invention according to the first aspect has a number of advantages. It allows the modems in the first group to enjoy the benefits of vectoring without modems in the second group negatively influencing it. This is also obtained without any modification needed to be made of the modems in the second group.

The modems may be digital subscriber line modems. They may with advantage furthermore be Very-high-speed Digital Subscriber Line 2 modems. The device may in turn be a digital subscriber line Access Multiplexer.

According to a second aspect of the invention, the investigated data sequence is the pilot sequence assigned to the second communication line.

It is possible that the investigated data sequence element does not correspond to the value expected by the modem in the second group.

According to a third aspect of the invention, the method then further comprises waiting until the modem of the second group expects said value and selecting the investigated data sequence element for transmission in a subsequent synchronisation interval after the expected value corresponds to the intended pilot sequence element value.

According to the same aspect, the decision entity of the device is further configured to wait until the modem of the second group expects the value and select the investigated data sequence element for transmission in a subsequent synchronisation interval after the expected value corresponds to the intended pilot sequence element value.

If an investigated data sequence element does not correspond to the value expected by the modem in the second group, the method may according to a fourth aspect of the invention further comprises provoking the modem in the second group to request a change of state and receiving a request for a change of state, said request for a change of state causing the modem in the second group to expect an element with a different value than before.

According to the fourth aspect of the invention the decision entity of the device is in the same manner further configured to provoke the modem in the second group to request a change of state and receive a request for a change of state, said request for a change of state causing the modem in the second group to expect an element with a different value than before.

The request for a change of state may furthermore be an online reconfiguration request and the provoking of a request for a change of state may be performed through changing a communication quality component of the second communication line.

The pilot sequence assigned to the second communication line may be an available sequence with the lowest number of value changes. Instead or additionally the assigned pilot sequence for the second communication line may be one having a first element which has an expected value.

According to a fifth aspect of the invention, the investigated element is an element of a first sequence assigned to the second communication line. Here there is furthermore a second sequence also assigned to the second communication line.

According to this fifth aspect the investigating of values, comparing of values and transmitting of an element is in the method performed for all elements of both sequences.

In relation to this fifth aspect, the first and second element investigating entities may be configured to investigate values, the comparing entity may be configured to compare values and the pilot sequence transmission control entity may be configured to provide elements for transmission in respect of all elements of both sequences.

According to a sixth aspect of the invention that is based on the fifth aspect, the method further comprises comparing the elements of both sequences with a pilot sequence element selection criterion for forming a pilot sequence assigned to the second communication line and choosing, for each element position in the corresponding pilot sequence to be formed, one element from either the first or the second sequence that fulfils the pilot sequence element selection criterion.

According to the same aspect of the invention, the pilot sequence transmission control entity furthermore compares the elements of both sequences with a pilot sequence element selection criterion for forming a pilot sequence assigned to the second communication line and chooses, for each element position in the corresponding pilot sequence to be formed, one element from either the first or the second sequence that fulfils the pilot sequence element selection criterion.

In the fifth and the sixth aspects it is furthermore possible that the elements of the first sequence all have a first value and the elements of the second sequence all have a second opposite value.

According to a seventh aspect of the invention, the method further comprises receiving a handshake from the modem in the second group as it is being connected to the second communication line, responding to the handshake with a pilot sequence assigned to the second communication line concurrently with sending pilot sequences to the modems in the first group and performing a responding handshake only after a complete pilot sequence has been transmitted to all modems in the first group.

According to the same aspect the pilot sequence transmission control unit of the device further comprises a handshaking entity configured to receive a handshake from the modem in the second group as it is being connected to the second communication line, order the pilot sequence transmission control entity to respond to the handshake with a pilot sequence assigned to the second communication line concurrently with sending pilot sequences to the modems in the first group and perform a responding handshake only after a complete pilot sequence has been transmitted to all modems in the first group.

According to an eight aspect of the invention, the method further comprises sending a signal for fast channel estimation to one modem in the first group in a part of a modem initialization procedure assigned to echo-canceller settings and at a point in time corresponding to the synch interval of the other modems in the first group.

According to the same aspect the device comprises a channel estimating entity configured to send a signal for fast channel estimation to a modem in the first group in a part of a modem initialization procedure assigned to echo-canceller settings and at a point in time corresponding to the synch interval of the other modems in the first group.

According to a ninth aspect of the invention, the method further comprises receiving from the modems in the first group quality measurements indicative of crosstalk coupling of the communication lines at the time of transmission of the pilot sequences, determining weights to be applied on transmissions on the communication lines and applying the weights on the transmissions to the modems of the first group.

According to the same aspect of the invention the pilot sequence transmission control entity in the pilot sequence transmission control unit of the device is further configured to receive, from the modems in the first group, quality measurements indicative of crosstalk coupling of the communication lines at the time of transmission of the pilot sequences, determine weights to be applied on transmissions on the communication lines and order the transmitting unit to apply the weights on the transmissions to the modems of the first group.

A tenth aspect of the invention is directed towards a method for limiting crosstalk between modems connected to a set of communication lines. There is here a first group of modems including at least one modem connected to a first communication line and the modems of the first group support vectoring. There is also a second group of modems including at least one modem connected to a second communication line and the modems of the second group do not support vectoring.

The method is performed in a device for providing access to a data communication network and comprises:
investigating the expected value of an element in a synchronisation interval to be received by a modem in the second group via the second communication line in the set of communication lines,
investigating the value of an element of at least one data sequence assigned to the second communication line,
comparing the two values with each other, and provoking the modem in the second group to request a change of state,
receiving a request for a change of state, said request for a change of state causing the modem in the second group to expect an element with a different value than before, and
transmitting the selected element on the second communication line together with corresponding elements of a number of pilot sequences on communication lines leading to the first group of modems after having received said request for a change of state.

The same aspect of the invention concerns a device for providing access to a data communication network for modems. This device is arranged to be connected to one end of each of a set of communication lines and the modems are connected to opposite ends of the communication lines. There is a first group of modems including at least one modem connected to the device via a first communication line and the modems of the first group support vectoring. There is also a second group of modems including at least one modem connected to the device via a second communication line and the modems of the second group do not support vectoring.

The device comprises:
a communication interface,
a transmitting unit connected to the communication interface and configured to modulate and transmit data to the modems via the set of communication lines,
a receiving unit connected to the communication interface and configured to receive and demodulate data from the modems, and
a pilot sequence transmission control unit comprising
    a first element investigating entity configured to investigate the expected value of an element in a synchronisation interval to be received by a modem in the second group via the second communication line,
    a second element investigating entity configured to investigate the value of an element of at least one data sequence assigned to the second communication line,
    a decision entity configured to compare the two values with each other, to provoke the modem in the second group to request a change of state if the value of the element does not correspond to the expected value, the request for a change of state causing the modem in the second group to expect an element with a different value than before, receive a request for a change of state and thereafter select the element of the investigated data sequence for transmission, and
    a pilot sequence transmission control entity configured to provide the selected element of the second communication line together with corresponding elements of a number of pilot sequences assigned to the first group of modems for transmission to the modems via the set of communication lines.

An eleventh aspect of the invention is concerned with the selection of pilot sequences for modems in the second group.

According to this aspect there is a method for limiting crosstalk between modems connected to a set of communication lines. There is here a first group of modems including at least one modem connected to a first communication line and the modems of the first group support vectoring. There is also a second group of modems including at least one modem connected to a second communication line and the modems of the second group do not support vectoring. The method is performed in a device for providing access to a data communication network and comprises:

selecting a pilot sequence for transmission to a modem in the second group, where a pilot sequence comprises elements capable of having a first or a second opposite value, wherein the step of selecting comprises selecting a pilot sequence having the fewest possible changes in element values.

According to the same aspect there is a device for providing access to a data communication network for modems. This device is arranged to be connected to one end of each of a set of communication lines and the modems are connected to opposite ends of the communication lines. There is a first group of modems including at least one modem connected to the device via a first communication line and the modems of the first group support vectoring. There is also a second group of modems including at least one modem connected to the device via a second communication line and the modems of the second group do not support vectoring. The device comprises:

a communication interface, a transmitting unit connected to the communication interface and configured to modulate and transmit data to the modems via the set of communication lines, a receiving unit connected to the communication interface and configured to receive and demodulate data from the modems, and a pilot sequence transmission control unit comprising a pilot sequence transmission control entity configured to select a pilot sequence for transmission to a modem in the second group.

Here a pilot sequence comprises elements capable of having a first or a second opposite value. Furthermore, the pilot sequence transmission control entity, when being configured to select a pilot sequence, is further configured to select a pilot sequence having the fewest possible changes in element values.

The lowest possible number of changes may be zero. This can also be combined with the first element of the pilot sequence having a value that the modem in the second group expects to receive in a synchronisation interval. The possible element values may here be +1 or −1.

Also a twelfth aspect of the invention is concerned with the selection of pilot sequences.

According to this aspect there is a method for limiting crosstalk between modems connected to a set of communication lines. There is here a first group of modems including at least one modem connected to a first communication line and the modems of the first group support vectoring. There is also a second group of modems including at least one modem connected to a second communication line and the modems of the second group do not support vectoring. The method is performed in a device for providing access to a data communication network and comprises:

transmitting a first sequence to a modem in the second group via a corresponding communication line, transmitting a second sequence to the modem via the corresponding communication line, where both sequences comprise elements capable of having a first or a second opposite value and the elements of the first sequence all have one of the values and the elements of the second sequence all have the opposite value, comparing the elements of both sequences with a pilot sequence element selection criterion for forming a pilot sequence assigned to said communication line, and choosing, for each element position in the corresponding pilot sequence to be formed, one element from either the first or the second sequence that fulfils the pilot sequence element selection criterion.

According to the same aspect there is a device for providing access to a data communication network for modems. This device is arranged to be connected to one end of each of a set of communication lines and the modems are connected to opposite ends of the communication lines. There is a first group of modems including at least one modem connected to the device via a first communication line and the modems of the first group support vectoring. There is also a second group of modems including at least one modem connected to the device via a second communication line and the modems of the second group do not support vectoring. The device comprises:

a communication interface, a transmitting unit connected to the communication interface and configured to modulate and transmit data to the modems via the set of communication lines, a receiving unit connected to the communication interface and configured to receive and demodulate data from the modems, and a pilot sequence transmission control unit comprising a pilot sequence transmission control entity configured to provide a first sequence for transmission to a modem in the second group via a corresponding communication line, provide a second sequence for transmission to said modem via said corresponding communication line, where both sequences comprise elements capable of having a first or a second opposite value and the elements of the first sequence all have one of the values and the elements of the second sequence all have the opposite value, compare the elements of both sequences with a pilot sequence element selection criterion for forming a pilot sequence assigned to the communication line, and choose, for each element position in the corresponding pilot sequence to be formed, one element from either the first or the second sequence that fulfils the pilot sequence element selection criterion.

The twelfth aspect may be varied in that the selection criterion may prescribe that half of the formed pilot sequence is supposed to have one value and half the opposite value. The transmissions of the first and second sequences may furthermore each be made simultaneously with the transmission of pilot sequences assigned to the modems in the first group.

According to a thirteenth aspect that is based on the twelfth aspect, the twelfth aspect may furthermore be varied through the pilot sequence transmission control entity receiving, from the modems in the first group, quality measurements indicative of crosstalk coupling of the communication lines at the time of transmission of the first and second sequences and only selecting measurements that relate to the chosen elements of the first and second sequences for performing crosstalk limitation activities in relation to said communication line.

According to a fourteenth aspect that is based on the twelfth aspect, the twelfth aspect may be further varied through there being at least two modems in the second group. In this case the communication line leading to a first of the modems in the second group is assigned a pilot sequence lacking changes in element values and with all elements having a value expected by the first the modem to appear in a synchronisation interval. The communication line leading to the second modem in the second group is then provided with a pilot sequence according to the twelfth aspect.

According to a fifteenth aspect that is based on both the twelfth and fourteenth aspect, there are more than two modems in the second group. Here the communication line leading to one of the modems in the second group is provided with a pilot sequence according to the principles of the twelfth aspect, while the communication lines leading to all the other modems in the second group are assigned the same pilot sequence lacking changes in element values and with all elements having a value expected by the first the modem to appear in a synchronisation interval. This type of assigning may then be iteratively repeated for all communication lines leading to modems in the second group until all have been assigned a pilot sequence according to the principles of the twelfth aspect.

According to a sixteenth aspect of the invention, when an element of a pilot sequence needs to be sent in a SYNCH interval to a line to which a modem in the second group is connected, and the value of the element to be sent does not match the value expected by this modem, then the value expected by said modem may be changed through provoking the modem to make a request for a change of state, such as an OLR request. Then, when the modem in question expects the element value, it may be sent without problems.

A pilot matrix may be defined as matrix having column vectors and row vectors. Each column vector of the pilot matrix corresponds to a pilot symbol sequence to be sent to a particular communication line. Each row vector of the pilot matrix corresponds to a set of symbols to be transmitted simultaneously (in a SYNCH interval) to communication lines of a vectoring group, where a vectoring group is made up of modems connected to a device for proving access to a data communication network, where the modems are to be passively or actively involved in vectoring. Hence, the pilot matrix has a number of columns equal to the number of communication lines connected to the device and a number of rows equal to the length of the pilot sequences.

A legacy pilot combination of a row of a pilot matrix is here defined as a sub-vector of the row vector of the pilot matrix, consisting of the elements of that row vector which reside in the columns corresponding to communication lines to which modems in the second group are connected.

Further, a legacy expected combination is here defined as a row vector where the elements are the symbols which the respective modems in the second group expect to receive in the SYNCH intervals.

In a seventeenth aspect of the invention, the following steps may be repeated transmitting row(s) if any, of a pilot matrix for which a legacy pilot combination matches a legacy expected combination to the communication lines, and when there are no such rows left to transmit, provoking one or more modems in the second group to request a change of state such that the legacy expected combination changes to match the legacy pilot combination of one or more rows until all the rows of the pilot matrix have been transmitted.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The invention concerns the reduction of cross talk between modems being connected to a device for providing access to a data communication network. The invention will in the following be described in relation to providing access to the Internet for Digital Subscriber Line (DSL) modems via the device. The device will in the following be described in relation to a Digital Subscriber Line Access Multiplexer (DSLAM). The modems are here furthermore provided in two groups: a first group supporting vectoring and a second group that does not support vectoring. It should here be realized that the invention is not limited to DSL modems but can be used also on other types of modems. For this reason it should also be realized that the device can be another type of device than a DSLAM.

Figure 1:
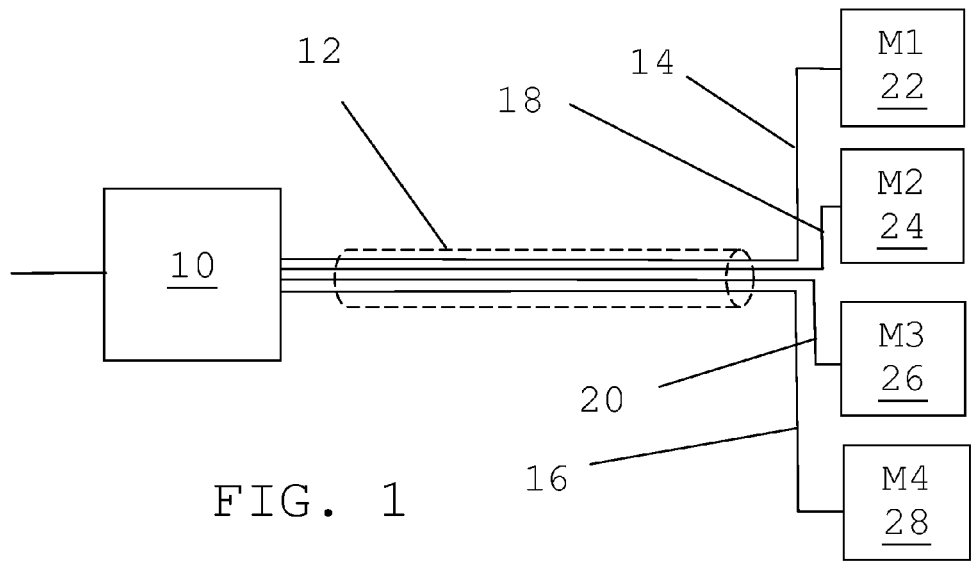
FIG. 1 schematically shows four modems connected to a device for providing access to a communication network.

FIG. 1 schematically shows a device 10 for providing access to a data communication network (not shown) in the form of a DSLAM and being connected to a number of modems 22, 24, 26, 28. The device 10 is here connected to one end of each of a set of communication lines 20, 18, 16 and 14 and the modems 22, 24, 26 and 28 are connected to opposite ends of the communication lines. These communication lines, which may be Plain Old Telephone Service (POTS) communication lines may be conductor pairs made of copper and may furthermore be provided as a set of communication lines which are bundled together in a cable 12. The modems connected to the DSLAM 10 here include a first group of modems supporting vectoring and second group of modems that do not support vectoring. The first group comprises a first, second and a third modem 22, 24 and 26, while the second group comprises a fourth modem 28. The modems in the second group are of an older type than the modems in the first group and are therefore also sometimes termed legacy modems.

Figure 2:
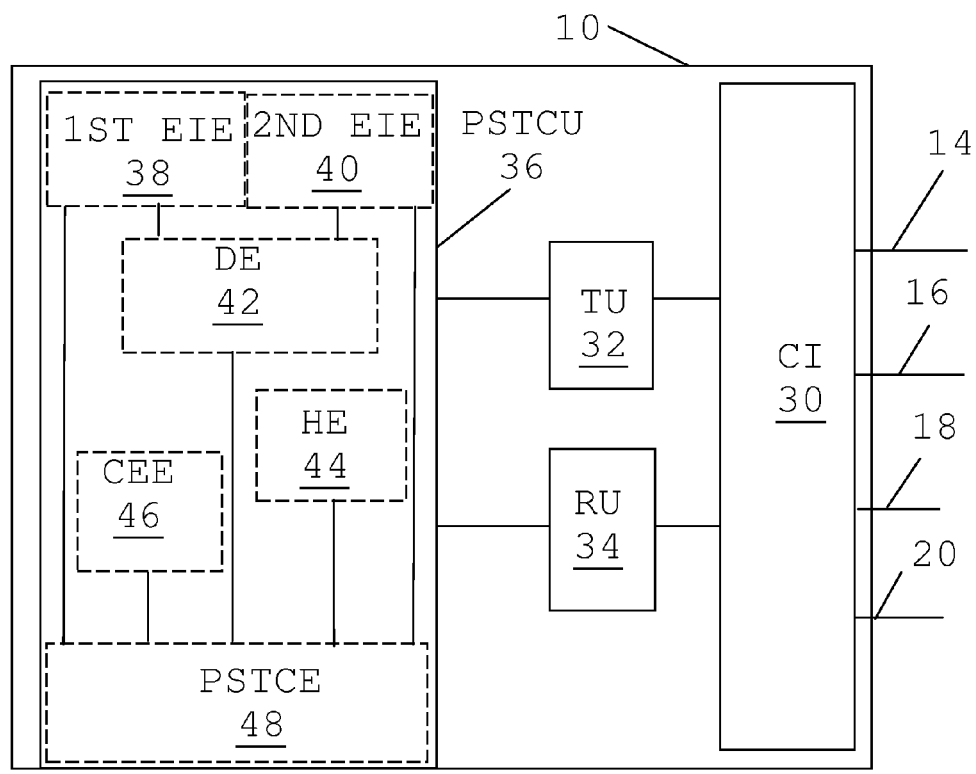
FIG. 2 shows a simplified block schematic of the device in FIG. 1.

A block schematic of some units of the DSLAM that are provided for explaining the invention are shown in FIG. 2. The DSLAM comprises a pilot sequence transmission control unit 36 connected to a communication interface via a transmitting unit 32 as well as via a receiving unit 34. The communication interface 30 is in turn connected to each of the communication lines 14, 16, 18 and 20. The pilot sequence transmission control unit 36 furthermore includes a number of entities. There is here a first element investigating entity 38, a second element investigating entity 40, a decision entity 42, a pilot sequence transmission control entity 48, a handshaking entity 44 and a channel estimating entity 46. Here the first and second element investigating entities 38 and 40 are both connected to the pilot sequence transmission control entity 48. Also the handshaking entity 44 and the channel estimating entity 46 are connected to the pilot sequence transmission control entity 48 as are the first and second element investigating entities 38 and 40.

The invention will in the following furthermore be described in relation to Very-high-speed Digital Subscriber Line 2 (VDSL2), which is a preferred environment in which the invention may be provided. It should however be realized that the invention is not limited to this standard either. This standard is generally described in the recommendation G.993.2 that has been issued by The Telecommunication Standardization Sector of the International Telecommunications Union (ITU-T). The recommendation G.993.2 is herein incorporated by reference.

As has been mentioned earlier, ITU-T has issued a further recommendation G.993.5, which specifies how vectoring can be used in VDSL2. Also this later recommendation G993.5 is herein incorporated by reference. The modems in the first group are in the exemplifying embodiments to be described here modems that support vectoring, i.e., they operate according to both the above described recommendations. However the modems in the second group do not support vectoring and are in the exemplifying embodiments described here modems only operating according to the ITU-T recommendation G.993.2.

Figure 3:
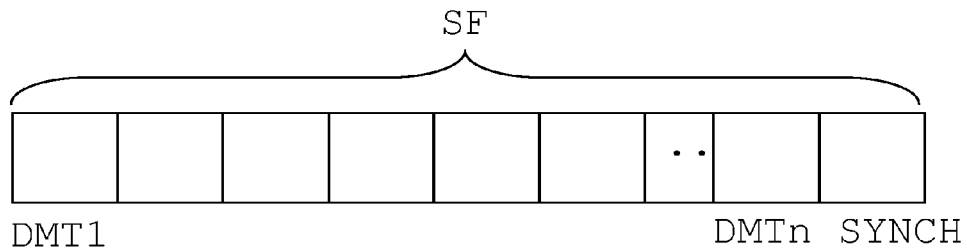
FIG. 3 shows a super frame including a number of signals modulated on tones

FIG. 3 schematically shows a superframe SF as specified by G.993.2. with a number of signals, where the signals are discrete multitone (DMT) symbols being modulated on tones. There may here typically be 257 DMT symbols in such a superframe SF, where 256 are used for ordinary data and the last, i.e., the $257^{th}$ symbol, typically provides a synchronisation section SYNCH. This last symbol is according to the ITU-T recommendation G.993.5 used for transmitting pilot sequences that are orthogonal to each other, which the modems that support vectoring use to provide signals indicative of crosstalk coupling in the communication lines. These signals are typically in the form of error samples, which are used by the DSLAM to estimate the FEXT channel in order to calculate pre-coder coefficients used for cancelling crosstalk when transmitting to the modems in the first group. The modems in the first group are thus actively involved in vectoring.

However, the modems of the second group do not recognize this and can therefore not receive the benefits of vectoring. Furthermore, they also expect the SYNCH symbol to have a certain value and if it does not, this may results in an error which could trigger a re-initialization of the modem. This latter case is serious in that it also makes vectoring impossible for the modems that do support it.

This problem can be solved through retrofitting the modems in the second group with functionality that stops the modems from interfering with the vectoring. However, this may be hard to implement since they are typically the property of end users, i.e., they may be Customer-premises equipment (CPE). These end users may refuse tampering or change of the modems. This means that other measures need to be made.

According to the invention this is done through transmitting data to a modem in the second group in at least a synchronisation interval. In a preferred variation of the invention the whole of the synchronization interval is used, i.e. the complete synch symbol is used for this data. Such transmitted data is used in a pilot sequence assigned to the communication line of the modem in the second group. However, the modem in the second group believes that this data is part of a SYNCH symbol having an expected SYNCH symbol element value. In this way the modem in the second group is passively involved in vectoring, in that their communication lines are used for vectoring while the modems do not participate through sending error samples.

How this is done will now be described in more detail also with reference being made to FIG. 4, which shows a flow chart of a number of method steps in a method according to a first embodiment of the invention. According to this first embodiment all modems are in showtime, i.e., they are all involved in communication sessions with the DSLAM 10.

According to G.993.2 a Far-end crosstalk (FEXT) cancellation channel is provided in the Synchronisation interval SYNCH of a super frame SF. However, as mentioned earlier, the legacy modem 28 does expect that the elements of the symbol in the SYNCH interval have a certain value. This means that there will most probably occur problems if a pilot sequence is transmitted to a legacy modem in the SYNCH interval.

The expected value mentioned above is normally initially the value of +1. This means that each symbol element in the SYNCH interval is according to ITU-T recommendation G.993.2 initially the value of +1. However, the modems may send requests for a change of state, i.e., a change of communication state on the communication line. Such a request for a change of state may be an online reconfiguration request (OLR). These requests can be sent for various reasons to the DSLAM, where an on-line reconfiguration request may be a request for a bit swap, seamless rate adaption (SRA) or emergency rate reduction (SOS) and could thus concern a change of the data rate. These requests are typically sent because a communication quality component of the communication line has deteriorated or is outside of its acceptable limits. The quality component can be such things a power level, signal to noise ratio and bit error rate. The DSLAM acknowledges the reception of such a request and indicates that the change will take effect within a given number of symbols through changing the sign of the elements of the SYNCH interval. If such a request is not acknowledged the modem continues to send requests. Therefore when a request is acknowledged there is a symbol element value change and the new symbol element value should then be continued to be used after the acknowledgement of the request. This means that after having sent an on-line reconfiguration request, the legacy modem expects to receive a change in symbol element value as an acknowledgement and thereafter the continued use of this new symbol element value until a new on-line reconfiguration request is being sent. This way of operating of the legacy modem is according to the invention used for transmitting a pilot sequence to the legacy modem. Pilot sequences are random patterns modulating a set of the tones in the sync-symbols.

A pilot sequence is here assigned to the second communication line 16 to which the legacy modem 28 is connected, which sequence is with advantage orthogonal to other pilot sequences assigned to the other lines 14, 18 and 20 leading to the modems in the first group, i.e. leading to the modems supporting vectoring. This sequence may here be stored in the second element investigating entity 40 of the pilot sequence transmission control unit 36, while corresponding expected SYNCH symbol element values may be stored in the first element investigating entity 38. These may be pre-stored. However it is possible that the data is provided by the pilot sequence transmission control entity 48 to these entities. When a pilot sequence symbol is to be transmitted in the SYNCH interval of a super frame SF, the first element investigating element 38 investigates the expected value of an element in a synchronisation interval (SYNCH) to be received or that is expected by the legacy modem, step 50, and sends the result of the investigation to the decision entity 42. At the same time the second element investigating entity 40 investigates the value of an element of at least one data sequence assigned to the second communication line. This data sequence is in this first embodiment of the invention the pilot sequence element value assigned to the communication line of the legacy modem, step 52. The second element investigating entity 40 then sends the result to the decision entity 42. The decision entity 42 thereafter compares these two values with each other and if they correspond and in this case if they are the same, step 54, for instance if both have the value of +1, then the decision entity 42 selects the element of the investigated data sequence element for transmission, step 59. The decision entity 42 then informs the transmission control entity 48 about the selection. The transmission control entity 48 thereafter fetches the selected symbol element and transmits it to the legacy modem 28 via the second communication line 16 using the transmitting unit 32 and communication interface 30. In order to be able to support vectoring corresponding symbol elements of the orthogonal sequences are simultaneously transmitted on the other communication lines to the other modems, i.e. to the modems in the first group. It can thus be seen that the pilot sequence transmission control entity 48 transmits one element of all pilot sequences to the modems, step 60. The other sequences can here be stored in the pilot sequence transmission control entity 48 itself or in separate pilot sequence symbol storages.

However, if the decision entity 42 finds that the values do not correspond to each other, step 54, and here that they are opposite, where one may have the value of +1 and the other the value of −1, the decision entity 42 then provokes the legacy modem to request a change of state and here to send an OLR request, step 56. This may be done through ordering the transmitting unit 32 to change a communication quality component of the second communication line 16, such as lowering the noise margin. This may be performed through lowering the power at which transmission is made, or lowering the quality through some other measure such as introducing more noise. The decision entity 42 then awaits such a request.

This change in quality will be detected by the legacy modem, which will send an on line request for instance requesting a change of bitrate.

A change of state request/OLR is then received by the pilot sequence transmission control element 48 via the communication interface 30 and the receiving unit 34 and forwarded to the decision entity 42. In this way the decision entity receives the request, step 58. As this is done it orders the second element investigating entity 40 to change the setting of the expected element value to the opposite of what was previously expected and thereafter selects the pilot sequence element from the first element investigating element 38, step 59, and orders the pilot sequence transmission control entity to transmit it together with the corresponding elements of the other pilot sequences, step 60. As these are then transmitted in the SYNCH interval, the legacy modem will believe it receives the acknowledgment of the request it sent, when in fact it actually received a symbol element in the pilot sequence.

If there is a need to change symbol element value again, it is here possible to yet again provoke a request for a change of state through changing the quality, for instance through raising it. The pilot sequence transmission control unit continues to operate in this way until all of the pilot sequences have been transmitted to the modems.

The modems in the first group constitutes a vectoring group and provides quality measurements indicative of crosstalk coupling based on the orthogonal pilot sequences. These quality measurements are typically error samples.

Figure 5:
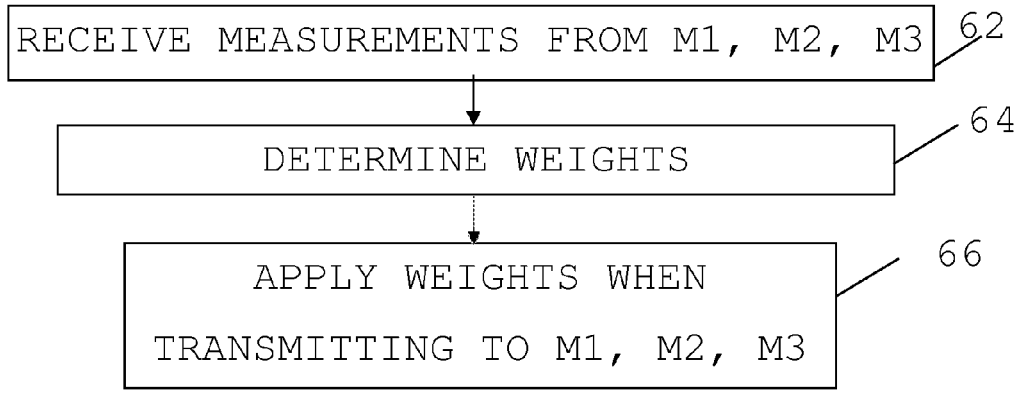

As this is done it receives measurements from the modems in the first group. How these are treated is shown in a flow chart in FIG. 5.

The pilot sequence transmission control entity 48 receives the quality measurements indicate of crosstalk coupling from the modems 22, 24 and 26 of the first group via the communication interface 30 and receiving unit 34, step 62. As mentioned earlier, these measurements are typically error samples. Based on these error samples the pilot sequence transmission control entity 48 then determines weights to be applied to the signals transmitted on the communication lines 14, 18 and 20 leading to the modems in the first group, step 64. These weights are then supplied to the transmitting unit 32, which applies them on the signals intended for the modems in the first group, step 66, and then transmits these weighted signals to the modems in the first group. These weights have here been selected for cancelling cross-talk on theses lines 14, 18 and 20 and thus to enhance the efficiency of the communication on the lines leading to the modems in the first group. How weights are selected is described in more detail in the ITU-T recommendation G.993.5.

The invention has a number of advantages. It allows the modems in the first group to enjoy the benefits of vectoring without modems in the second group negatively influencing this vectoring. This is also obtained without any modification needed to be made of the modems in the second group. Since state change requests made from the legacy modem are according to the first embodiment of the invention provoked whenever the expected SYNCH interval symbol element value does not correspond to a pilot sequence symbol element value to be sent, the transmission of the pilot sequence is furthermore fast.

Figure 6:
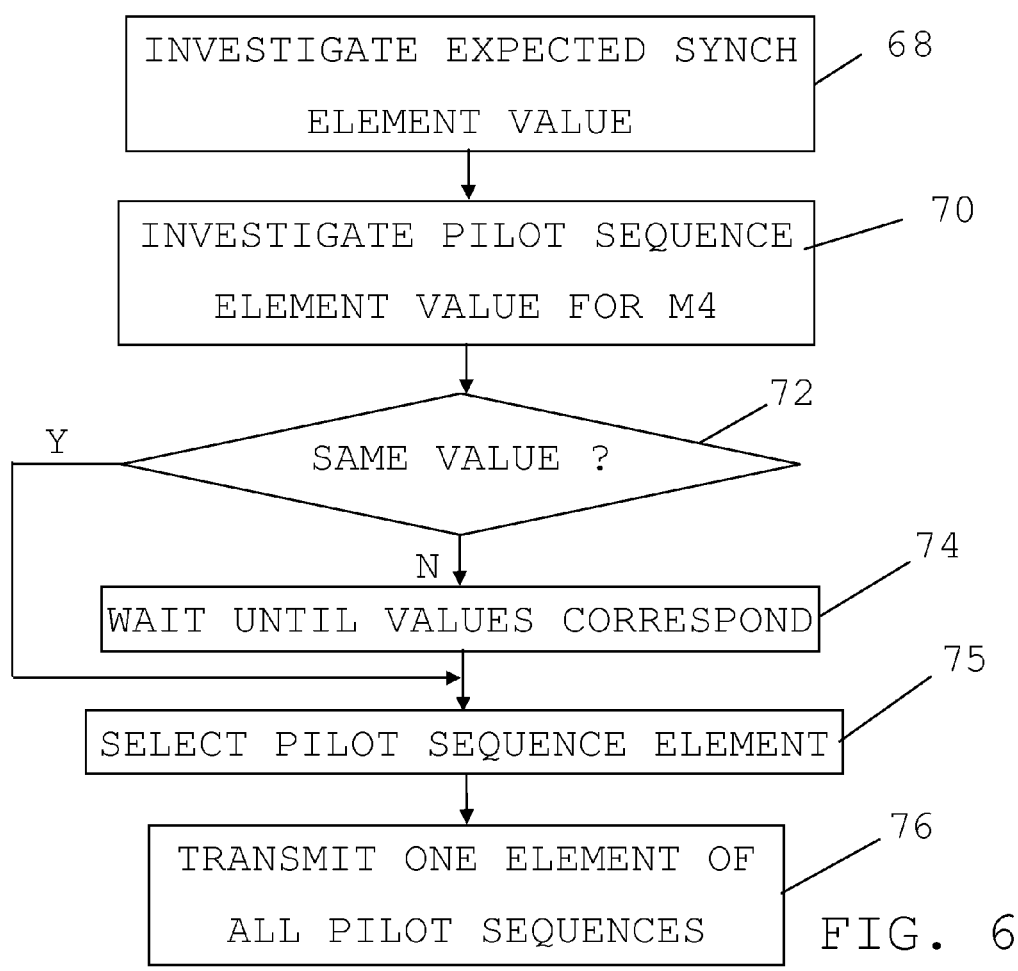

However, especially if the number of modems is low, it is possible to avoid such provoking. How the inventive principle can be used without providing a change is schematically shown in FIG. 6, which shows a flow chart of a method according to a second embodiment of the invention.

Here the first element investigating entity 38 investigates the expected synch symbol element value, step 68, and the second element investigating entity 40 investigates the pilot sequence symbol element value, step 70, and forwards their results to the decision entity 42 in the same way as in the first embodiment. The decision entity 42 also here determines if the values correspond or not, here that they are the same, step 72. In the case of the values corresponding, the pilot sequence symbol element is selected by the decision entity 42 in the same way as in the first embodiment and one element of all pilot sequences transmitted by the pilot sequence transmission control entity 48, step 76, also in the same way as earlier described. However, if they do not correspond, step 72, the decision entity 42 decides to postpone transmission of the pilot sequence symbol element. It therefore waits until the values correspond to each other, step 74. It therefore informs the pilot sequence transmission control entity 48 that no pilot sequence elements need to be sent. The pilot sequence transmission control entity 48 may instead transmit the value that is expected in the SYNCH interval. However, this value is no part of the pilot sequence. It is here possible that elements of the other pilot sequences are being sent while the decision entity 42 is waiting. However, these elements would in this case have to be resent later when there is a correspondence of symbol element values in relation to the second communication line 16.

The decision entity 42 thus waits until there is a change in expected SYNCH interval symbol element value, which change may again be caused by a request for a change of state. It thus waits until a subsequent synchronisation interval is reached after the expected value corresponds to the intended pilot sequence element value. In this case the request for a change of state would be a request sent by the legacy modem on its own initiative uninfluenced by the DSLAM.

This second embodiment has the further advantage of avoiding manipulation of the legacy modem. The legacy modem thus operates more smoothly than in the first embodiment. However, this embodiment may lead to a very long time passing in order to transfer a whole pilot sequence. It might therefore be of interest to reduce this time. One thing that is important in this respect is the number of changes between symbol element values in the pilot sequence and another is what the first symbol element value is in the sequence.

According to one variation of the invention the pilot sequence selected for a legacy modem is the one of the possible pilot sequences that has the least amount of value changes. In one special case there are no changes at all but the whole sequence has the same value. This can be combined with or instead it is possible that a pilot sequence selected for a legacy modem starts with a symbol element value that is the same as that which a legacy modem initially expects in the SYNCH interval.

The above mentioned variations of the invention are with advantage, either singly or jointly, combined with the second embodiment described above. However they can with advantage also be combined, singly or jointly, with the first embodiment.

As mentioned above there may exist a need for limiting the number of changes in pilot sequences transmitted on lines leading to legacy modems, because it may be difficult or undesirable to make a legacy modem expect new SYNCH symbol values.

It is here possible with a delay between sign changes in pilot sequences between the lines leading to modems in the first group and lines leading to modems in the second group. This means that it is possible to relax the requirement that the pilot sequence between lines leading to modems in the second group and lines leading to modems in the first group need to be synchronized.

Dependant on the number of communication lines leading to legacy modems and the lines leading to modems supporting vectoring, a number of different schemes may be used for estimating the crosstalk.

One of the required properties of the pilot sequences used for estimating a weight or crosstalk coupling coefficient is that the different pilot sequences should be orthogonal to each other. With one legacy modem it is possible to let the pilot sequence assigned to the communication line of this modem have only one symbol element value, which may be either +1 or −1. In this case the +1 or −1 on all synch symbols should be reserved to be used only by lines leading to modems of the second group, i.e. to modems that do not support vectoring. Using this principle it is possible to avoid state transitions of the SYNCH symbols, i.e., transitions from +1 to −1 or from −1 to +1.

One variation of this scheme is based on the assumption that the crosstalk among lines leading to the first group of modems supporting vectoring is sufficiently cancelled, which means that a pilot sequence transmitted to a legacy modem does not have to be orthogonal to the pilot sequences transmitted on the lines leading to the modems in the first group, i.e., to the modems supporting vectoring. When quality measurements indicative of crosstalk coupling such as error samples are collected, it is only the communication lines leading to the legacy modems that will contribute to the error samples.

According to this variation there is one state change. It is thus as an example important that the data transmitted to the modems in the second group has a change of element value as the modems in the first group receive pilot sequences. This means that there is only one state change from +1 to −1 or −1 to +1. This also means that in fact there are two sequences assigned to a line leading to a legacy modem, which two sequences are together used for forming a pilot sequence or the equivalent of a pilot sequence. This formed pilot sequence may also be termed a hybrid pilot sequence. The elements of one of the sequences have all one of the values or states of +1 or −1 and the elements of the other the opposite value or state.

Figure 4:
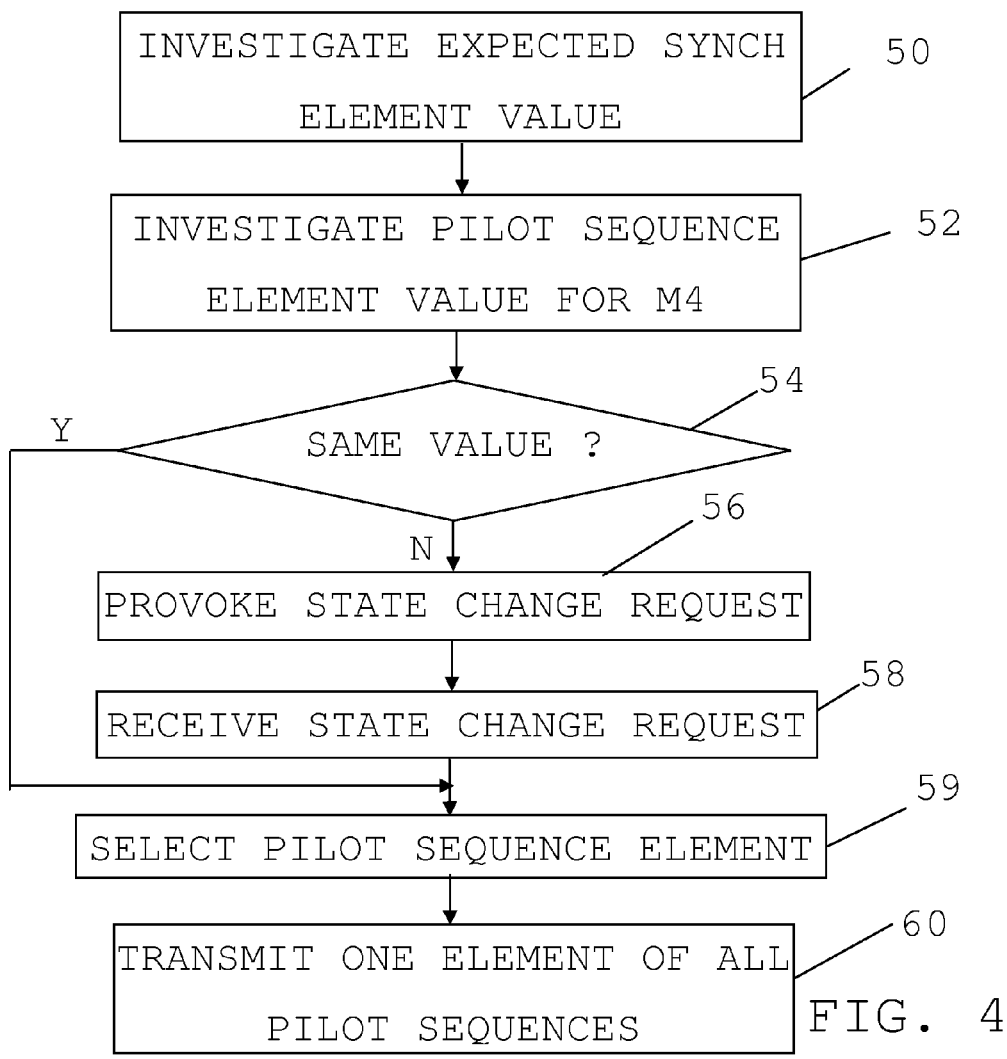
FIG. 4 shows a flow chart of a method for limiting crosstalk according to a first embodiment of the invention, FIG. 5 schematically shows a flow chart of a number of method steps for setting weights in order to cancel cross-talk between modems, FIG. 6 schematically shows a flow chart of a method for limiting crosstalk according to a second embodiment of the invention.
Figure 9:
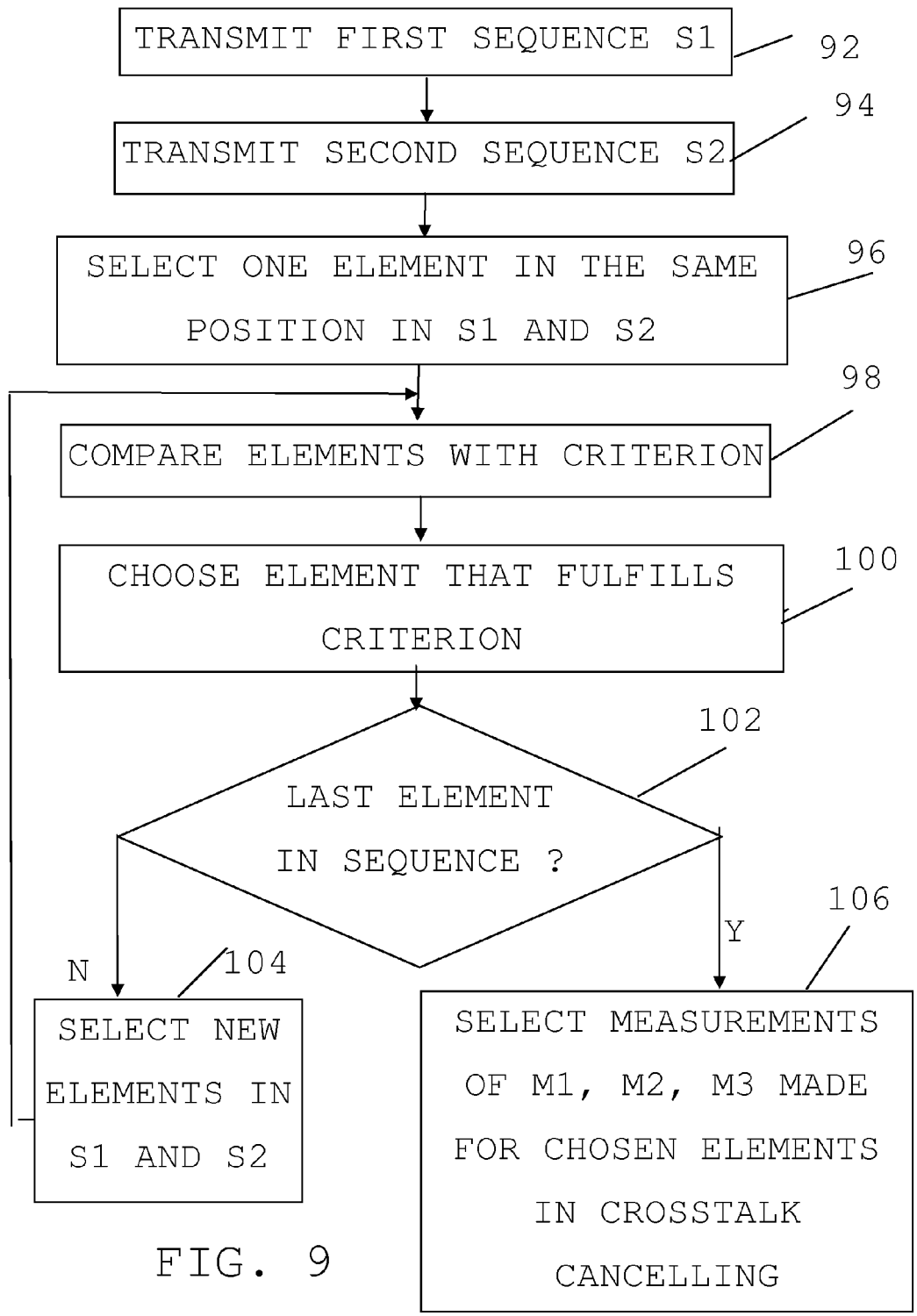
FIG. 9 shows a number of method steps being performed in another variation of the invention.

How this may be implemented in the device of FIG. 4, is schematically shown by the method steps depicted in FIG. 9.

First the pilot sequence transmission control entity 48 of the pilot sequence transmission control unit 36 transmits the first sequence S1, step 92, which may typically be done with the help of the transmitting unit 32. Also here there may be a checking of element values against expected SYNCH element values performed by the entities 38, 40 and 42. However the elements of this first sequence may be pre-selected to have values that the legacy modem expects. It is therefore possible that a check is only made after the first sequence has been transmitted. Thereafter the pilot sequence transmission control entity 48 makes sure that the second sequence S2 is transmitted, step 94. However, all elements of this second sequence S2 have the opposite value of the elements of the first sequence S1. This means that the transmission of the second sequence S2 cannot be performed until after the legacy modem has requested a state change. Such a request may be provoked or unprovoked. This means that the pilot sequence transmission control unit may provoke the state change or wait until the legacy modem requests it. The modems in the first group here receive orthogonal pilot sequences at the same time. This means that each pilot sequence assigned to a modem in the first group is transmitted twice, once together with the first sequence and then again together with the second sequence. Furthermore, error samples are returned for each of these transmitted elements of both the first and the second sequences. These may be stored in the pilot sequence transmission control entity or in a separate memory which this entity has access to. Once both sequences S1 and S2 have been transmitted, the pilot sequence transmission control entity 48 compares the elements of the two sequences with a pilot sequence element selection criterion used for forming a pilot sequence assigned to the second communication line. This means that the elements of corresponding sequence positions are combined for providing resulting combinations forming a pilot sequence assigned to the second communication line.

The pilot sequence transmission control entity therefore selects one element in each sequence, where these elements have the same positions in relation to each other in the sequences, step 96. They may initially be the elements in the first positions of the sequences. These selected elements are then compared with the selection criterion, step 98, and then the one of them that fulfils this criterion is chosen, step 100. It thus chooses one element from either the first or the second sequence that fulfils the pilot sequence element selection criterion. Typically the one is chosen which has a value that is the same as that of the assigned pilot sequence element. The pilot sequence transmission control entity then investigates if the elements were the last of the sequences, step 102, and if not a new element is selected in each sequence, step 104, for instance the elements in the second positions of the two sequences. This then continues until all elements have been compared. This means that the step of choosing is performed for each element position in the pilot sequence that is to be formed If however the compared elements were the last of the sequences, step 102, then the pilot sequence transmission control entity selects measurements provided by the modems in the first group, i.e., measurements provided by the modems 22, 24 and 26, step 106. More particularly the measurements selected are only those measurements that have been made in relation to the chosen sequence elements.

It can thus be seen that one element value transition is required as these two sequences, each having a length of a pilot sequence, are being transmitted. This means that the first of these sequences being transmitted has element values that are the same as the legacy modem expects. Then either a state change request is provoked or awaited. After such a state change request has been received the second sequence is transmitted, having the opposite element value. Each time a sequences is transmitted, the modems in the first group receive the pilot sequences assigned to the communication lines leading to them. This also means that the total length of sequence elements received by the legacy modem will be two pilot sequences long. Here half the error samples from the first sequence may be used together with a half from the second sequence in order to determine the crosstalk contribution from the communication line leading to the legacy modem. It can thus be seen that element values of these two sequences are chosen for forming one pilot sequence of the legacy modem, where half may be taken from the first sequence and the other half from the second sequence. The measurements indicative of crosstalk coupling were received from all modems in the first group in relation to the complete transmitted sequences. However, only the measurements that have been obtained in relation to chosen elements are selected. This means that only these measurements are used when determining weights, i.e., when determining measures to be applied for cancelling crosstalk coupling, in relation to the second communication line.

In case there are two legacy modes connected to the DSLAM it is possible that the pilot sequence assigned to one of the lines is one without state transitions, i.e. one having element values of either only +1 or −1, while the other line has two sequences that together are used for forming one pilot sequence, for instance in the above described manner. The total number of state change requests for obtaining complete symbol sequences is here limited to two or less.

In case there are more than two legacy modems then the following principle may be used for updating crosstalk estimation from two legacy modems at one time.

If there are N communication lines leading to legacy modems in the second group, then this Per Line channel estimation may be performed through iteratively alternating pilot sequences on these N communication lines according to the following principle.

In a first step the special pilot sequence, +1 +1 . . . +1 (reserved for communication lines leading to legacy modems) is transmitted on lines 1-(N−1) simultaneously with two sequences on line N, i.e. a first sequence having one element value, +1 or −1 followed by a second sequence having the opposite sign on an Nth line. Measurements indicative of crosstalk coupling, like error samples, are then obtained from the communication lines leading to the modems supporting vectoring. Then elements of the sequences are chosen for forming a pilot sequence of the Nth line and the error samples obtained in relation to the transmission of the chosen elements selected for use in vectoring.

This is then repeated for all lines leading to legacy modems. This means that next another line, like for instance line N−1, may receive the pair of sequences and the other lines the special pilot sequence. The measurements indicative of crosstalk coupling are then obtained from the communication lines leading to the modems supporting vectoring.

The above described way of operating is then continued for the (N−2)-th line, (N−3)-th line, etc. until all N lines have received the first and second sequences and the processing in relation to these sequences has been performed.

This way of operating has several advantages. The total time required will be less than or equal to N*(1 single line OLR transit+1 multi-line OLR transit) N*2 pilot sequence long error sample acquisition time. The time saving will be approximately $N/2^N$ time of state transition only. For 4 lines: ½ time 8 lines: ¹⁄₁₆ time.

The functioning of some variations of the invention may furthermore be described in the following way.

The set of pilot sequences to be transmitted to the communication lines of a vectoring group may for purposes of measuring crosstalk coefficients be described by a pilot matrix. A vectoring group is typically all the modems that are involved in vectoring, actively or passively. A pilot matrix furthermore comprises row vectors and column vectors. Each column vector of the pilot matrix corresponds to the symbol sequence to be sent to a particular communication line. Each row vector of the pilot matrix corresponds to a set of symbols to be transmitted simultaneously (in a SYNCH interval) to the communication lines in the vectoring group. Hence, the pilot matrix has a number of columns equal to the number of lines in the vectoring group and a number of rows equal to the length of the pilot sequences.

The pilot sequences are orthogonal to each other, meaning that the scalar product of any two column vectors in the pilot matrix is zero.

A transceiver unit at the Optical network unit (VTU-O) may be provided by the DSLAM.

The VTU-O transmits the rows of the pilot matrix to the lines of the vectoring group, and receives (from the vectoring modems only) measurements indicate of cross-talk coupling in the form of error samples, one for each line, for each sent row of the pilot matrix. Hence, the received error samples may be described by an error sample matrix, where each column corresponds to a line to which a vectoring modem, i.e., a modem in the first group, is connected, and each row holds the error samples received in response to the sending of a row of the pilot matrix. Hence, the error sample matrix has a number of rows equal to the length of the pilot sequences, and a number of columns equal to the number of lines to which vectoring modems are connected.

These error samples are used for measuring crosstalk coefficients.

For purposes of measuring crosstalk coefficients, it does not matter in which order the rows of the pilot matrix are sent to the lines, as long as the VTU-O keeps track of the correspondence between transmitted rows of the pilot matrix and received rows of the error sample matrix (i.e., so that it is known which row of the error sample matrix was received as a result of sending any particular row of the pilot matrix). This follows from the fact that even if the order of the rows of the pilot matrix will be rearranged, the scalar product between column vectors will not change, and hence orthogonality will be preserved.

Further, it also does not matter for the purpose of measuring crosstalk coefficients if the sending of the rows of the pilot matrix takes place in consecutive SYNCH intervals or not, again provided that the VTU-O keeps track of the correspondence between sent rows of the pilot matrix and received rows of the error sample matrix. For example, because of timing issues, or for ease of implementation, it may be desirable to send other data in between the sending of rows in the pilot matrix, for example a dummy row vector consisting of a vector of the pilot matrix with an element changed, or even repeating the sending of one or more rows of the pilot matrix.

The legacy pilot combination of a particular row of the pilot matrix is here defined as a sub-vector of the row vector of the pilot matrix, consisting of the elements of that row vector which reside in the columns corresponding to lines to which legacy modems are connected.

Further, the legacy expected combination is here defined as a row vector where the elements are the symbols which the respective legacy modems expect to receive in the SYNCH intervals.

Hence, if the legacy pilot symbol combination of a row of the pilot matrix matches the legacy expected symbol combination, then that row of the pilot matrix may be sent without causing any legacy modem to consider the received value as erroneous.

Now, in order to measure crosstalk coefficients, the pilot matrix needs to be sent. However, if the legacy pilot combination of a sent row does not match the legacy expected combination, then errors may occur, which is undesirable.

Therefore, if the legacy expected combination does not match the legacy pilot combination of a row of the pilot matrix, the VTU-O may provoke one or more of the legacy modems to request a change of state (e.g., OLR request) which causes them to expect a different combination as a result of the execution of the request. Hence, the VTU-O may change a communication quality component such as the output power for a particular tone, so as to cause the legacy modem to request a change of state such as making an OLR request. The modem or modems to be so provoked are chosen so that the new legacy expected combination will match the legacy pilot combination of a row of the pilot matrix which is to be sent.

Further, in order to reduce the number of such provocations needed, the sending of rows and the provocation of requests may take place in the following fashion, an example of which is displayed in FIG. 10.

As long as there are rows in the pilot matrix where the legacy pilot combination matches the legacy expected combination, then those rows are transmitted. If a legacy modem makes a request for a state change (such as an OLR request) by its own initiative (e.g., because of changing line conditions), then transmission simply continues with other rows of the pilot matrix for which the legacy pilot combination now matches the legacy expected combination.

When there are no further rows of the pilot matrix to be transmitted for which the legacy pilot combination matches the current legacy expected combination, then one or more modems are provoked to request a change of state (e.g., OLR request) such that the new legacy expected combination will match the legacy pilot combination for one or more unsent rows of the pilot matrix.

Transmission of rows then continues in the same way (provoking requests when necessary) until all rows of the pilot matrix have been transmitted.

Another way to reduce the number of provocations needed which may be used together with the way described above, is to select pilot sequences for the legacy modems such that the number of legacy pilot combinations is as low as possible. For example, one of those pilot sequences may be selected as a sequence where the elements all have the same value.

When all the rows of the pilot matrix have been transmitted and the corresponding error sample matrix has been received, it will be possible for VTU-O to calculate the crosstalk coefficients using known methods.

Figure 10:
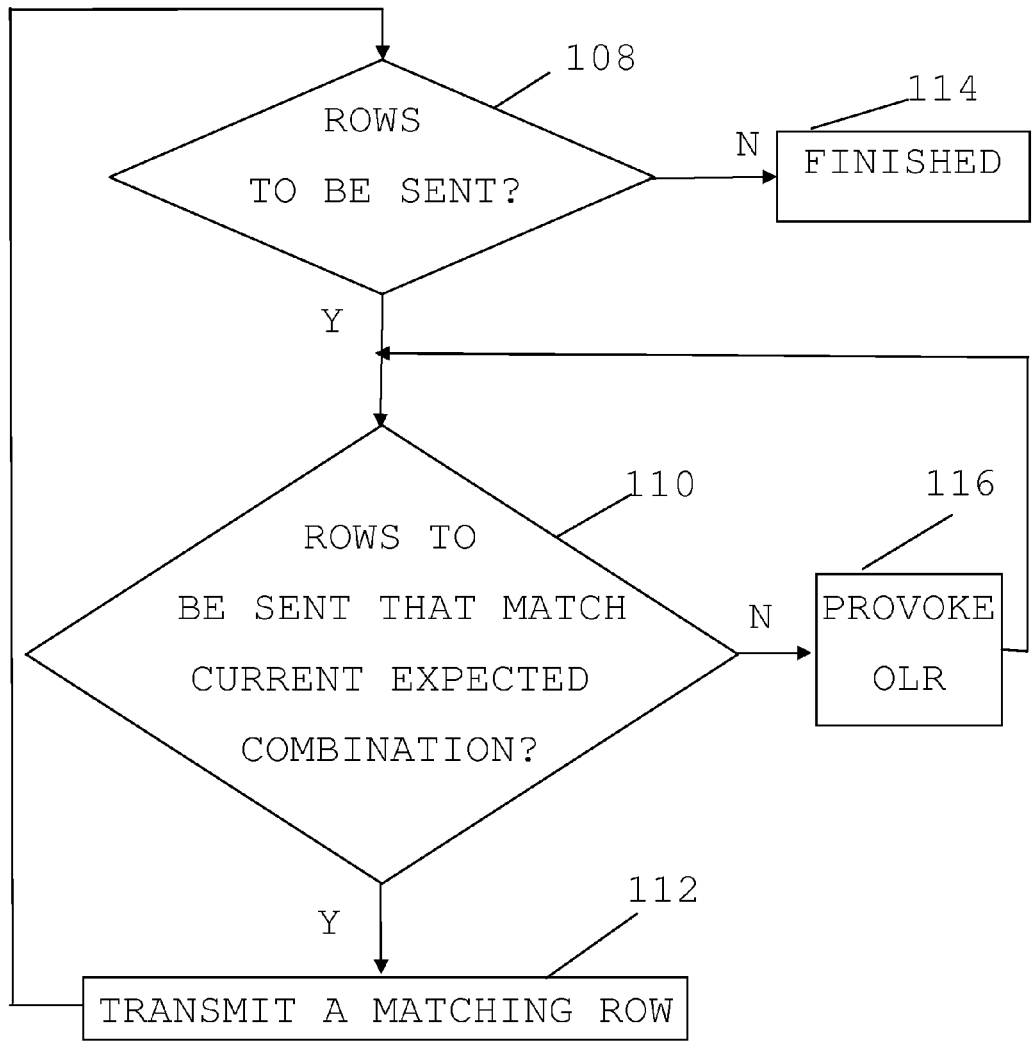
FIG. 10 shows a number of method steps being performed in a further variation of the invention.

With reference to FIG. 10, more specifically a pilot matrix may be transmitted to the lines as follows.

In a step 108 the VTU-O checks if there are rows in the pilot matrix which need to be sent. If not, the sending of the pilot matrix is finished, step 114.

Else, the VTU-O checks if there are any rows of the pilot matrix which need to be sent and for which the legacy pilot combination matches the legacy expected combination, step 110. If there is one or more such rows, one of them is transmitted to the lines, step 112, and the process repeats from step 108.

If there are no such rows, one or more OLR requests are provoked, step 116.

Then it is again checked if there are matching rows, step 110. If the provocation of the OLR request(s) was successful and there was no spontaneous OLR request from another legacy modem, then there will be matching row(s) to be transmitted. If this is the case, the process continues with step 112, and so on. If it is not the case, then further OLR provocations must be done until the legacy expected combination matches the legacy pilot combination of a row to be sent.

The first and second embodiments as well as variations described above were related to reducing cross talk in case all modems were in showtime, i.e., all were actively receiving and/or transmitting data from and to the DSLAM 10. However, it is possible that a legacy modem connects to a DSLAM when there are already modems in the first group being in showtime. This may be handled in a different way. A further variation of the invention is concerned with this situation.

Figure 7:
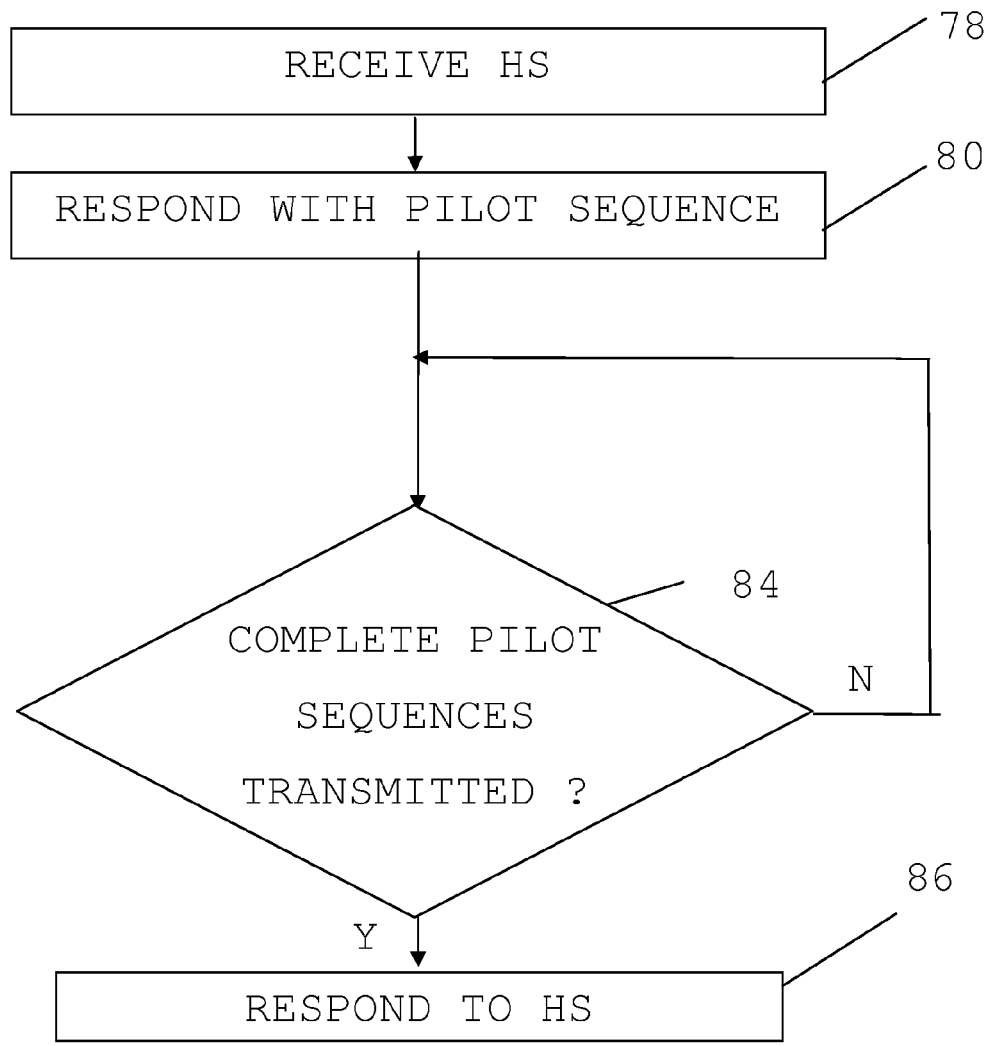
FIG. 7 shows a number of method steps being performed in one variation of the invention, and FIG. 8 schematically shows a computer program product in the form of a CD ROM disc with a computer program performing the functionality of the invention when being loaded into a device for providing access to a data communication network.

A flow chart of a number of method steps for handling this situation is schematically shown in FIG. 7.

When a line that is a member in a vectoring group is in deactivated state and wants to initialize for entering showtime this is done through a joining procedure which is performed in 3 phases;
1. The lines that are in showtime learns the crosstalk from the joining line in order to be able to cancel it.
2. The joining line learns the crosstalk from the existing lines and cancel this crosstalk
3. The joining line goes through the VDSL2 initialization phases modified for updating crosstalk cancellers and finally enters showtime.

This can of course not be followed when a legacy modem in the second group is to enter Showtime. However, it would be beneficial if the first step could be followed in order to avoid degradation in the communication of the modems in the first group as the legacy modem enters showtime.

Therefore as a modem in the second group, such as the modem 28, is being connected to the DSLAM 10 via the second communication line 16 in order to allow the user of the modem to access a data communication network such as the Internet, the legacy modem 28 sends a handshake signal to the DSLAM 10. The DSLAM thus receives a handshake signal, step 78. This handshake signal is furthermore forwarded to the handshaking entity 44 via the receiving unit 34 and communication interface 30. The handshaking entity 44 then makes sure that no responding handshake is sent. Instead it orders the pilot sequence transmission control entity 48 to respond to the handshake with a pilot sequence being assigned to the second communication line 16, step 80. This pilot sequence has to be sent at the same time as the other pilot sequences are being sent to the first group of modems. This means that even though there is no limitation to transmitting in a SYNCH interval on the second communication line 16 leading to the legacy modem 28, the pilot sequence does still have to be transmitted simultaneously with the pilot sequences of the modems in the first group, and these may be transmitted in SYNCH intervals. The handshaking entity 44 then monitors the transmission of the pilot sequence by the pilot sequence transmission control entity 48, and as long as a complete sequence has not been transmitted, step 84, it continues to wait. However, as soon as the complete pilot sequence has been transmitted and the other lines have learned the crosstalk from the joining legacy line and cancelled the FEXT, step 84, the handshaking entity 44 orders the pilot sequence transmission control entity 48 to respond to the handshake with a response handshake signal, step 86. It can thus be seen that the handshaking entity 44 receives a handshake from the modem in the second group as it is being connected to the first communication line, orders the pilot sequence transmission control entity to respond to the handshake with the pilot sequence concurrently with sending pilot sequences to the modems in the first group and performs a responding handshake only after a complete pilot sequence has been transmitted to all modems in the first group.

When this has been done the legacy modem gets connected to the DSLAM in a known way as is for instance described in the ITU-T recommendation G.993.2.

The operation of the legacy modem is not influenced by this activity. It cannot decipher the pilot sequence it received. However, it does understand that the data it receives is no responding handshake. It therefore waits for a responding handshake. It may however continue to send handshaking signals.

It is here furthermore possible that the pilot sequence transmission control unit further comprises a channel estimating entity 46. This channel estimating entity 48 may order the pilot sequence transmission control entity 48 to send a signal for fast channel estimation to a modem in the first group. This may in this example furthermore be sent in a art of a modem initialization procedure assigned to echo-canceller settings, this modem initialization procedure is here thus a VDSL2 initialization procedure. This signal will normally have to be transmitted in the intervals corresponding to the synch interval of the other active modems. It is thus transmitted at a point in time corresponding to the synch interval of the other modems in the first group. This may allow a faster transmission of pilot sequences and thus a faster cancellation of crosstalk and entering of show time for the legacy modem.

Figure 8:
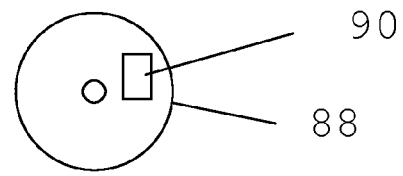

The pilot sequence transmission control unit and its entities may with advantage be provided in the form of a processor with associated program memory including computer program code for performing the functionality of the pilot sequence transmission control unit. It should be realized that this unit may also be provided in the form of hardware, like for instance in the form of an Application Specific Integrated Circuit (ASIC). The computer program code may also be provided on a computer-readable means or medium, for instance in the form of a data carrier, like a CD ROM disc or a memory stick, which will implement the function of the above-described pilot sequence transmission control unit when being loaded into the above-mentioned program memory and run by the processor. One such computer program product in the form of a CD ROM disc 88 with such a computer program code 90 is schematically shown in FIG. 8.

The transmitting unit may typically be a conventional VDSL2 coding an modulating unit, which modulates and transmits data to the modems, while the receiving unit may be a conventional VDSL2 decoding and demodulating unit, which receives and demodulates data from the modems. The communication interface may furthermore be a conventional subscriber line interface.

There are a number of modifications that can be made to the present invention apart from those that have already been described. The pilot sequence transmission control unit may for instance be provided without handshaking and channel estimating entities. It is also possible that the at least one data sequence being investigated is not a pilot sequence but another sequence used for obtaining the pilot sequence. It is furthermore possible that the transmission of elements used in pilot sequences are transmitted before the comparison instead of after as in the first and second embodiments. Furthermore, in the second embodiment described above, the decision entity selected pilot sequence elements for transmission as soon as the comparison indicated that element values corresponded to each other. It should however be realized that that it may wait some before transmitting a pilot sequence element.

Therefore, while the invention has been described in connection with what is presently considered to be most practical and preferred embodiments, it is to be understood that the invention is not to be limited to the disclosed embodiments and variations, but on the contrary, is intended to cover various modifications and equivalent arrangements. Therefore the invention is only to be limited by the following claims.

What is claimed is:

1. A method for limiting crosstalk between modems connected to a set of communication lines,
where there is a first group of modems including at least one modem connected to a first communication line, and the modems of the first group support vectoring,
and a second group of modems including at least one modem connected to a second communication line, and the modems of the second group do not support vectoring,
the method being performed in a device for providing access to a data communication network and comprising:
investigating an expected value of an element in a synchronization interval to be received by a modem in the second group via the second communication line in the set of communication lines,
investigating a value of an element of at least one data sequence assigned to the second communication line,
comparing the expected value and the value with each other,
selecting the element for transmission if the value of the element corresponds to the expected value, and transmitting the selected element on the second communication line together with corresponding elements of a number of pilot sequences on communication lines leading to the first group of modems.

2. The method of claim 1, wherein the data sequence investigated is a pilot sequence assigned to the second communication line.

3. The method of claim 2, further comprising, if the investigated data sequence element does not correspond to the value expected by the modem in the second group:
waiting until the modem of the second group expects the value and
selecting the investigated data sequence element for transmission in a subsequent synchronization interval after the expected value corresponds to the intended pilot sequence element value.

4. The method of claim 1, further comprising, if an investigated data sequence element does not correspond to the value expected by the modem in the second group, provoking the modem in the second group to request a change of state, and receiving a request for a change of state, the request for a change of state causing the modem in the second group to expect an element with a different value.

5. The method of claim 4, wherein the request for a change of state is an online reconfiguration request.

6. The method of claim 4, wherein provoking a request for a change of state comprises changing a communication quality component of the second communication line.

7. The method of claim 1, wherein a pilot sequence assigned to the second communication line is an available sequence with a lowest number of value changes.

8. The method according to claim 1, wherein an assigned pilot sequence for the second communication line is one having a first element which has an expected value.

9. The method according to claim 1, wherein the element is an element of a first sequence assigned to the second communication line; a second sequence is also assigned to the second communication line; and investigating values, comparing values, and transmitting an element are performed for all elements of both sequences.

10. The method of claim 9, further comprising comparing the elements of both sequences with a pilot sequence element selection criterion for forming a pilot sequence assigned to the second communication line, and choosing, for each element position in the corresponding pilot sequence to be formed, one element from either the first sequence or the second sequence that fulfils the pilot sequence element selection criterion.

11. The method of claim 9, wherein the elements of the first sequence all have a first value and the elements of the second sequence all have a second opposite value.

12. The method according to claim 1, further comprising receiving a handshake from the modem in the second group as it is being connected to the second communication line, responding to the handshake with a pilot sequence assigned to the second communication line concurrently with sending pilot sequences to the modems in the first group, and performing a responding handshake only after a complete pilot sequence has been transmitted to all modems in the first group.

13. The method of claim 12, further comprising sending a signal for fast channel estimation to a modem in the first group in a part of a modem initialization procedure assigned to echo-canceller settings and at a point in time corresponding to the synch interval of the other modems in the first group.

14. The method of claim 1, further comprising receiving from the modems in the first group quality measurements indicative of crosstalk coupling of the communication lines at the time of transmission of the pilot sequences, determining weights to be applied on transmissions on the communication lines, and applying the weights on the transmissions to the modems of the first group.

15. A device for providing access to a data communication network for modems, the device being arranged to be connected to one end of each of a set of communication lines and the modems being connected to opposite ends of the communication lines, a first group of the modems including at least one modem connected to the device via a first communication line, the modems of the first group supporting vectoring, a second group of modems including at least one modem connected to the device via a second communication line, and modems of the second group not supporting vectoring, the device comprising:
a communication interface,
a transmitting unit connected to the communication interface and configured to modulate and transmit data to the modems via the set of communication lines,
a receiving unit connected to the communication interface and configured to receive and demodulate data from the modems, and
a pilot sequence transmission control unit, comprising
a first element investigating entity configured to investigate an expected value of an element in a synchronization interval to be received by a modem in the second group via the second communication line,
a second element investigating entity configured to investigate a value of an element of at least one data sequence assigned to the second communication line, and
a decision entity configured to compare the two values with each other and select the element of the investigated data sequence for transmission if the value of the element corresponds to the expected value, and
a pilot sequence transmission control entity configured to provide the selected element of the second communication line together with corresponding elements of a number of pilot sequences assigned to the first group of modems for transmission to the modems via the set of communication lines.

16. The device of claim 15, wherein the investigated data sequence is a pilot sequence assigned to the second communication line.

17. The device of claim 15, wherein if an investigated data sequence element does not correspond to the value expected by the modem in the second group, the decision entity is further configured to wait until the modem of the second group expects the value and select the investigated data sequence element for transmission in a subsequent synchronization interval after the expected value corresponds to the intended pilot sequence element value.

18. The device of claim 15, wherein if an investigated data sequence element does not correspond to the value expected by the modem in the second group, the decision entity is further configured to provoke the modem in the second group to request a change of state and receive a request for a change of state, the request for a change of state causing the modem in the second group to expect an element with a different value.

19. The device of claim 18, wherein the request for a change of state is an online reconfiguration request.

20. The device of claim 18, wherein the decision element is further configured to cause a change of a communication quality component of the second communication line when provoking a request for a change of state.

21. The device of claim 15, wherein the element is an element of a first sequence assigned to the second communication line; a second sequence is also assigned to the second communication line; and the first and second element investigating entities are configured to investigate values, the comparing entity is configured to compare values, and the pilot sequence transmission control entity is configured to provide elements for transmission in respect of all elements of both sequences.

22. The device of claim 21, wherein the pilot sequence transmission control entity is further configured to compare the elements of both sequences with a pilot sequence element selection criterion for forming a pilot sequence assigned to the second communication line and choosing, for each element position in the corresponding pilot sequence to be formed, one element from either the first or the second sequence that fulfils the pilot sequence element selection criterion.

23. The device of claim 21, wherein the elements of the first sequence all have a first value and the elements of the second sequence all have a second opposite value.

24. The device of claim 15, wherein the pilot sequence transmission control unit further comprises a handshaking entity configured to receive a handshake from the modem in the second group as it is being connected to the second communication line, to order the pilot sequence transmission control entity to respond to the handshake with a pilot sequence assigned to the second communication line concurrently with sending pilot sequences to the modems in the first group, and to perform a responding handshake only after a complete pilot sequence has been transmitted to all modems in the first group.

25. The device of claim 24, wherein the pilot sequence transmission control unit further comprises a channel estimating entity configured to send a signal for fast channel estimation to a modem in the first group in a part of a modem initialization procedure assigned to echo-canceller settings and at a point in time corresponding to the synch interval of the other modems in the first group.

26. The device of claim 15, wherein the modems are digital subscriber line modems.

27. The device of claim 26, wherein the modems are Very-high-speed Digital Subscriber Line 2 modems.

28. The device of claim 15, wherein the device is a digital subscriber line Access Multiplexer.

29. A computer program product comprising a non-transitory computer readable medium for limiting crosstalk between modems connected to a set of communication lines, a first group of modems including at least one modem connected to a device for providing access to a data communication network for modems via a first communication line, modems of the first group supporting vectoring, a second group of modems including at least one modem connected to the device via a second communication line, and modems of the
  second group not supporting vectoring, the computer program product comprising non-transient computer program code on a data carrier which when run on a processor forming a pilot sequence transmission control unit of the device, causes the pilot sequence transmission control unit to:
  investigate an expected value of an element in a synchronization interval to be received by a modem in the second group via the second communication line,
  investigate a value of an element of at least one data sequence assigned to the second communication line, compare the values with each other,
  select the element of the investigated data sequence for transmission if the value of the element corresponds to the expected value, and
  provide the selected element of the second communication line together with corresponding elements of a number of pilot sequences assigned to the first group of modems for transmission to the modems via the set of communication lines.

* * * * *

UNITED STATES PATENT AND TRADEMARK OFFICE
CERTIFICATE OF CORRECTION

PATENT NO. : 8,588,051 B2
APPLICATION NO. : 13/021734
DATED : November 19, 2013
INVENTOR(S) : Eriksson et al.

Page 1 of 1

It is certified that error appears in the above-identified patent and that said Letters Patent is hereby corrected as shown below:

In the Specification

In Column 11, Line 12, delete "interface" and insert -- interface 30 --, therefor.

In Column 13, Line 19, delete "element 38" and insert -- entity 38 --, therefor.

In Column 13, Line 65, delete "element 48" and insert -- entity 48 --, therefor.

In Column 14, Line 5, delete "element 38," and insert -- entity 38, --, therefor.

In Column 20, Line 58, delete "phases;" and insert -- phases: --, therefor.

In Column 20, Line 62, delete "crosstalk" and insert -- crosstalk. --, therefor.

In Column 21, Line 56, delete "in a art" and insert -- in a part --, therefor.

Signed and Sealed this
Fifteenth Day of July, 2014

Michelle K. Lee
*Deputy Director of the United States Patent and Trademark Office*